July 16, 1968  J. K. RHODES ET AL  3,393,024
BEARING ASSEMBLY
Filed Aug. 25, 1965
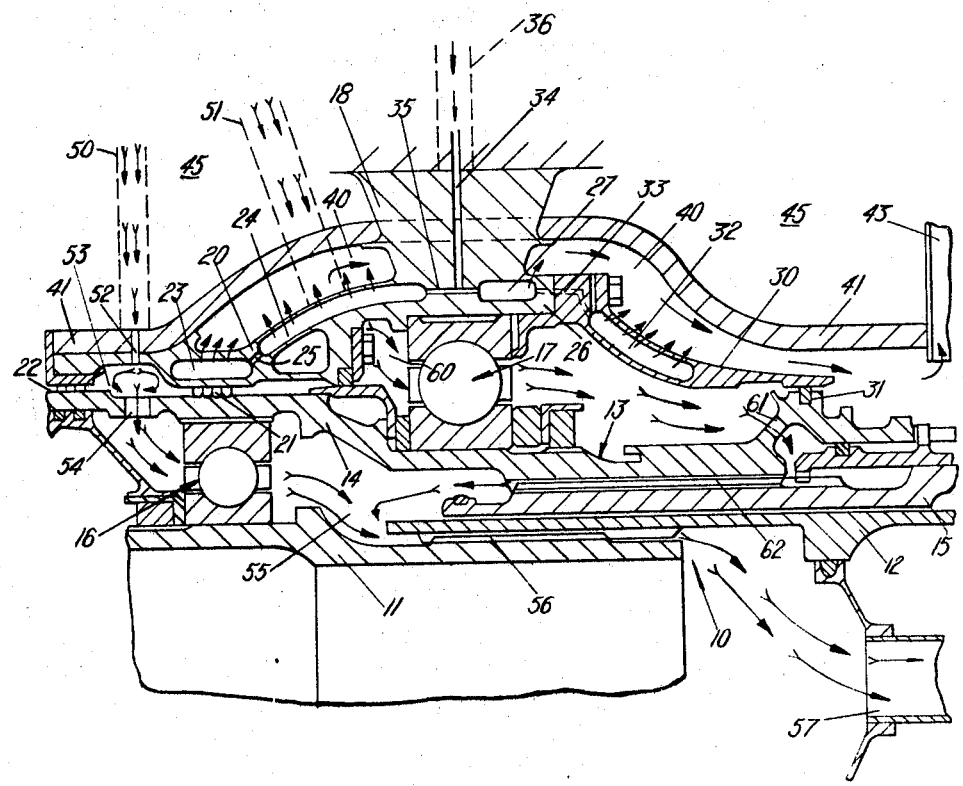

3,393,024
BEARING ASSEMBLY
John Kenneth Rhodes, Littleover, Derby, and Roy Allen, Long Eaton, England, assignors to Rolls-Royce Limited, Derby, England, a British company
Filed Aug. 25, 1965, Ser. No. 482,391
Claims priority, application Great Britain, Sept. 4, 1964, 36,437/64
3 Claims. (Cl. 308—77)

ABSTRACT OF THE DISCLOSURE

A bearing assembly comprises a bearing which is surrounded by a hollow cooling jacket which extends inwardly on both sides of the bearing and is sealed to a shaft mounted in the bearing. Coolant is supplied to the interior of the jacket and passes outwardly through a porous outer wall thereof into a surrounding annular space, before being withdrawn from the assembly, the cooling fluid in said jacket and said space providing thermal barriers.

---

This invention concerns a bearing assembly, and although not so restricted it will hereinafter be described with reference to its use in gas turbine jet propulsion engines.

According to the present invention a bearing assembly comprises a static housing structure, a bearing mounted within said structure, a shaft mounted within said bearing, a hollow jacket attached to the housing structure and surrounding the bearing, said hollow jacket extending inwardly on both sides of the bearing, the interior of said hollow jacket providing an annular chamber means, the radially outer wall of which, remote from said bearing, is porous, a wall member spaced from and enclosing said jacket and defining therewith an annular space, means for supplying said chamber means with coolant so as to fill said chamber means with coolant and to provide a first thermal barrier, the pores of said radially outer wall defining a plurality of substantially radial flow passages through which the coolant in operation passes into said space to provide a second thermal barrier in said space and to reduce the heat transfer across said radially outer wall by effusion cooling, the said wall member constituting a thermal radiation shield, and means for withdrawing the coolant from said annular space and means for supplying lubricant to the bearing inwardly of said hollow jacket.

Preferably part of the jacket is integral with said static housing structure and part is attached to said static housing structure.

In one arrangement according to the invention the wall member extends around said shaft and jacket, and makes sealing contact with said shaft on opposite sides of said jacket.

Preferably the coolant is a mixture of gaseous nitrogen and air.

In the preferred embodiment the bearing is also supplied direct with an oil mist to cool and lubricate it, this mist flowing through an annulus defined between said jacket and the shaft.

The bearing may be the main bearing of a gas turbine jet propulsion engine.

The invention also includes a gas turbine jet propulsion engine provided with a bearing assembly as set forth above.

The invention is illustrated, merely by way of example, in the accompanying drawing which shows a part sectional elevation of a bearing assembly in accordance with the present invention.

Referring to the drawing, there is shown part of a gas turbine jet propulsion engine comprising a composite low pressure shaft 10 constituted by two intersplined shafts 11 and 12 on which are mounted a low pressure compressor and a low pressure turbine of the engine (not shown). The engine also includes a composite high pressure shaft 13 constituted by two intersplined shafts 14, 15 on which are mounted a high pressure compressor and a high pressure turbine (not shown).

An intershaft bearing 16 is disposed between shafts 11 and 14 and a main bearing 17, rotatably supporting shaft 14, is housed within an annular static housing srtucture 18. Integral with structure 18 and extending axially to one side thereof is an annular hollow member 20 which makes sealing contact with shaft 14 at seals 21 and 22. Hollow member 20 is provided with annular chambers 23, 24 interconnected by ducts 25. Integral with the opposite side of housing structure 18 is an annular flange 26 provided with an annular chamber 27. An annulus 30 is fixed to annular flange 26 and makes sealing contact with shaft 14 at a seal 31. An annular chamber 32 is provided in said annulus 30 and communicates with annular chamber 27 via connecting ducts 33.

The annular housing structure 18 is provided with passageways 34, 35 by means of which a coolant mixture of gaseous nitrogen and air may be introduced into chambers 24 and 27 from a feed duct 36. The coolant may thus flow into hollow chambers 23 and 32 via ducts 25 and 33.

The outer walls (i.e. those remote from bearing 17) of the hollow annular member 20, annular flange 26 and annulus 30 are all porous and thus the coolant within chambers 23, 24, 27, 32 may flow outwardly away from bearing 17 as indicated by the plain arrows in the drawing.

The escaping coolant emerges from chambers 23, 24, 27, 32 into an annular space 40 defined between member 20, flange 26 and annulus 30 and a wall or sleeve 41 which constitutes a thermal radiation shield for bearing 17. The coolant flows from space 40 to an outlet tube 43 in which it is conducted overboard.

The annular member 20, annular flange 26 and annulus 30 together constitute a composite hollow jacket which extends substantially completely around three sides of main bearing 17 i.e. around its outer and its two side faces. Thus this composite hollow jacket is interposed between main bearing 17 and the hot components and gases of the engine which are disposed externally of sleeve 41 in area 45 for example.

The coolant within chambers 23, 24, 27, 32 constitutes a substantially continuous first thermal insulation barrier for the main bearing 17. The coolant within space 40 constitutes a continuous second thermal insulation barrier for main bearing 17. Thus main bearing 17 is insulated from hot gases and components by a double barrier of coolant as well as the sleeve 41 and the structure constituting the jacket within which chambers 23, 24, 27 and 32 are formed.

To lubricate and cool the bearings 16 and 17 directly, an oil mist is directed to these bearings through tubes 50, 51 respectively. Oil mist flows are indicated by feathered arrows. The oil mist from tube 50 passes through an aperture 52 in sleeve 41 and member 20 and into a compartment 53 defined between seals 21, 22 between member 20 and shaft 14. The oil mist then flows through an aperture 54 in shaft 14 to bearing 16. The oil in the oil mist lubricates the bearing and the air carrying the oil effectively cools the bearing. Upon leaving the bearing 16 the oil mist passes through an intershaft space 55 and between the splined connection 56 (which it lubricates) between shafts 11 and 12 with a scavenge tube 57 mounted within shaft 12 by means of which the oil mist is directed overboard.

The oil mist from tube 51 passes into an annular space 60 between annular member 20 and shaft 14 in which bearing 17 is disposed. The oil mist lubricates and cools the bearing and passes out of the space through an aperture 61 in shaft 14, passing through and lubricating the splined connection 62 between shafts 14 and 15. The oil mist enters chamber 55 where it mixes with the oil mist from bearing 16, passing through the splined connection 56 to scavenge tube 57.

The manner in which the oil mist and/or the gaseous nitrogen and air are produced and fed to tubes 50, 51 and duct 36 may be of the form described and claimed in U.S. application Ser. No. 481,580, filed Aug. 23, 1965 (now U.S. Patent No. 3,321,910).

It will be appreciated that, although particularly useful in shielding bearings of gas turbine engines from hot gases therein, the present invention is not so restricted and may be used in any location where it is desired to shield bearings from thermal radiation.

We claim:

1. A bearing assembly comprising a static housing structure, a bearing mounted within said structure, a shaft mounted within said bearing, a hollow jacket attached to the housing structure and surrounding the bearing, said hollow jacket extending inwardly on both sides of the bearing, the interior of said hollow jacket providing annular chamber means the radially outer wall of which, remote from said bearing, is porous over the major portion of its surface, a wall member spaced from and enclosing said jacket and defining therewith an annular space means, means for supplying said chamber means with coolant so as to fill said chamber means and to provide a first thermal barrier, the pores of said radially outer wall defining a plurality of substantially radial flow passages through which the coolant in operation passes into said space means to provide a second thermal barrier in said space means and to reduce the heat transfer across said radially outer wall, the said wall member constituting a thermal radiation shield, and means for withdrawing the coolant from said annular space means and means for supplying lubricant to the bearing inwardly of said hollow jacket.

2. A bearing assembly as claimed in claim 1 in which said means for supplying said coolant are adapted to supply a coolant mixture of gaseous nitrogen and air.

3. A bearing assembly as claimed in claim 1 in which said annular chamber means is disposed radially outward of said bearing.

References Cited

UNITED STATES PATENTS

| | | | |
|---|---|---|---|
| 1,108,761 | 8/1914 | Kieser | 308—76 |
| 2,576,141 | 11/1951 | Pike | 308—77 X |
| 2,623,353 | 12/1952 | Gerard | 253—39 X |
| 2,660,485 | 11/1953 | Gerard | 308—9 |
| 2,680,001 | 6/1954 | Batt | 308—77 X |
| 2,709,567 | 5/1955 | Wood | 308—76 X |
| 3,057,542 | 10/1962 | Keenan et al. | 308—77 X |
| 2,619,797 | 12/1952 | Haworth | 60—39.16 X |
| 2,740,267 | 4/1956 | Bayard | 60—39.08 X |

FOREIGN PATENTS

| | | |
|---|---|---|
| 400,159 | 1/1932 | Great Britain. |
| 1,061,978 | 12/1953 | France. |

EDGAR W. GEOGHEGAN, *Primary Examiner.*

MARTIN P. SCHWADRON, *Examiner.*

G. N. BAUM, *Assistant Examiner.*